US006366739B1

United States Patent
Yoshihara et al.

(10) Patent No.: US 6,366,739 B1
(45) Date of Patent: *Apr. 2, 2002

(54) EQUIPMENT USING SOLAR BATTERY

(75) Inventors: Akira Yoshihara; Takayuki Tsuboi; Kiyokazu Churei, all of Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/873,018

(22) Filed: Jun. 11, 1997

Related U.S. Application Data

(63) Continuation of application No. 08/257,117, filed on Jun. 8, 1994, now abandoned.

(30) Foreign Application Priority Data

Jun. 11, 1993 (JP) ............................................... 5-140686

(51) Int. Cl.[7] ........................ G03B 17/00; G03B 17/02; G03B 7/26; H02N 6/00
(52) U.S. Cl. ........................ 396/304; 396/448; 396/535; 136/245; 136/246
(58) Field of Search ............................. 396/301, 304, 396/535, 539, 448; 136/245, 246, 251, 256, 258, 259, 291, 292, 293

(56) References Cited

U.S. PATENT DOCUMENTS

| 4,095,997 A | * | 6/1978 | Griffiths ........................ 136/89 |
| 4,328,456 A | | 5/1982 | Suzuki et al. ................... 320/7 |
| 4,421,943 A | * | 12/1983 | Withjack ....................... 136/246 |
| 4,558,634 A | * | 12/1985 | Oshiro et al. ................. 98/2.18 |
| 4,642,413 A | * | 2/1987 | Ovshinsky .................... 136/249 |
| 4,759,735 A | * | 7/1988 | Pagnol et al. .................. 441/16 |
| 4,786,851 A | * | 11/1988 | Fuji et al. ........................ 320/2 |
| 5,250,265 A | * | 10/1993 | Kawaguchi et al. ......... 422/107 |
| 5,424,800 A | * | 6/1995 | Suzuki ......................... 354/484 |
| 5,792,279 A | * | 8/1998 | Tsuboi et al. ................ 136/245 |
| 6,044,230 A | * | 3/2000 | Tsuboi ......................... 396/304 |
| 6,061,977 A | * | 5/2000 | Toyama et al. ............. 52/173.3 |

FOREIGN PATENT DOCUMENTS

| DE | 2907155 A1 | 8/1979 |
| DE | 9000240 U1 | 3/1991 |
| JP | 63-160056 | 7/1988 |
| JP | 2-83640 | 6/1990 |

* cited by examiner

*Primary Examiner*—Christopher E. Mahoney
(74) *Attorney, Agent, or Firm*—Fitzpatrick, Cella, Harper & Scinto

(57) ABSTRACT

An apparatus adapted for use with a solar cell, such as a camera, includes a body and a cover member to which the solar cell is attached, where the cover member is movable between an open position and a closed position with respect to the body of the apparatus. The apparatus further includes an air layer providing member which provides an air layer between the cover member and the body of the apparatus when the cover member is in the closed position, thereby reducing transmittance of heat from the solar cell to the body of the apparatus.

59 Claims, 5 Drawing Sheets

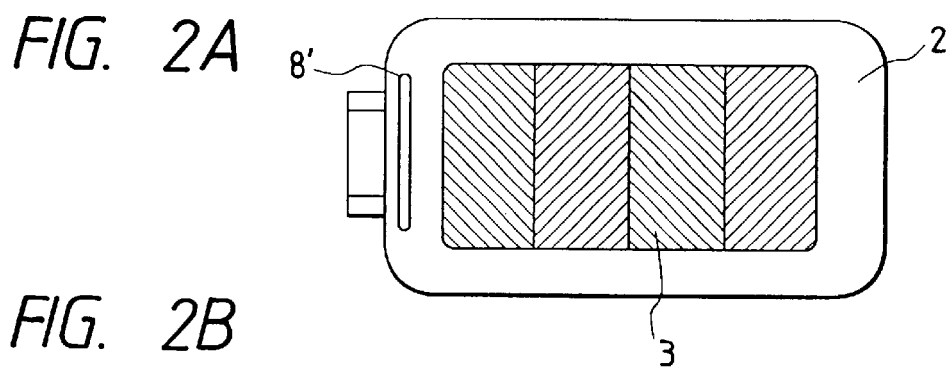
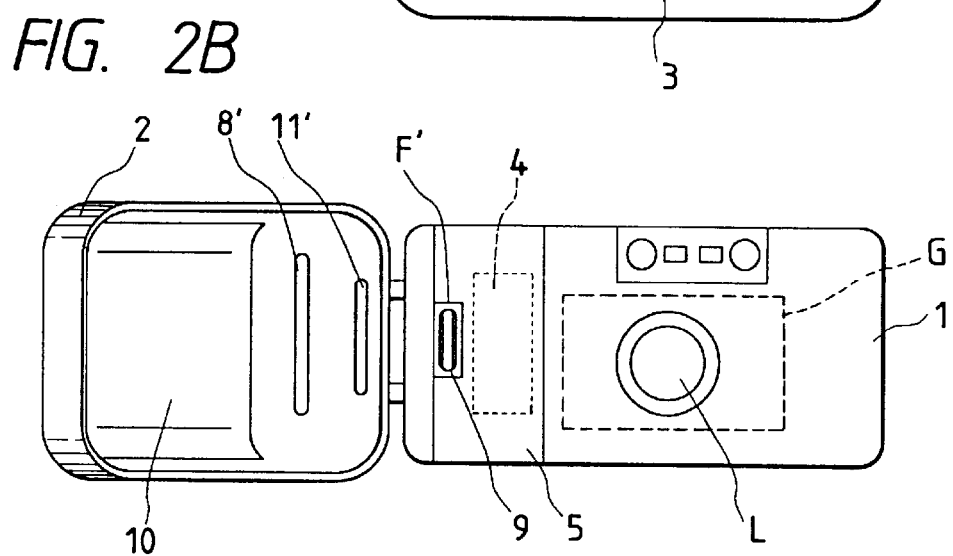
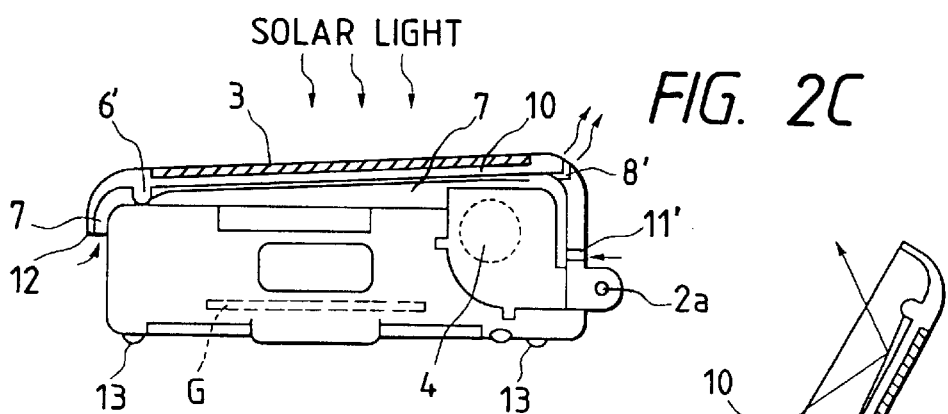
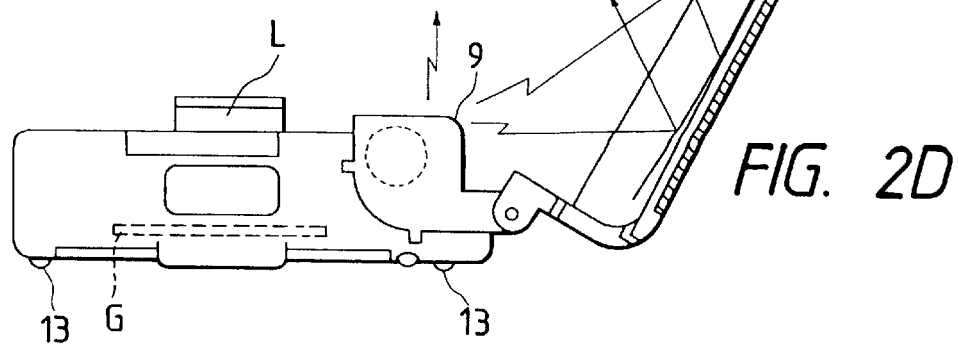

EQUIPMENT USING SOLAR BATTERY

This application is a continuation of application Ser. No. 08/257,117 filed Jun. 8, 1994, now abandoned.

BACKGROUND OF THE INVENTION

1. Field of the Invention

The present invention relates to heat insulation or dissipation of an equipment using a solar battery.

2. Related Background Art

Conventionally, various applications associated with a portable electronic equipment with a solar battery have been proposed. In particular, as for a heat insulation or dissipation (radiation) structure to a main body equipment, as described in Japanese Utility Model No. 63-160056, a secondary battery and a solar battery are integrally detachable from a main body. When energy is to be charged under the solar light, the batteries are detached from the main body, and consequently, the main body equipment is protected from heat.

However, in such a structure, an attachment/detachment mechanism becomes undesirably complicated, and a contact portion is easily contaminated, thus causing a conduction failure. Furthermore, when a user erroneously places the main body equipment as a whole under the solar light, the temperature of the main body equipment increases, resulting in troubles.

In recent years, a lithium ion battery available from Sony Energy Tech Kabushiki Kaishya has characteristics suitable for a combination with a solar battery, i.e., it has no memory effect and suffers less self-discharging as compared to a conventional nickel-cadmium battery. However, the lithium ion battery is weak against a high temperature. Overcoming this drawback poses a bottleneck in the manufacture of a portable electronic equipment with a solar battery.

SUMMARY OF THE INVENTION

One aspect of the present invention is to provide an equipment using a solar energy collecting unit, such as, for example, a solar battery, which comprises a space forming portion for forming a space for at least one of heat insulation and heat dissipation between at least one of an equipment and a charging unit, and a solar battery, and can prevent deterioration, destruction, and the like of an equipment arrangement, the charging unit, an image recording medium, and the like due to an increase in temperature.

Other aspects of the present invention will become apparent from the following description of the preferred embodiments.

BRIEF DESCRIPTION OF THE DRAWINGS

FIGS. 2A to 2D are views illustrating the respective states of a camera according to the second embodiment of the present invention;

DETAILED DESCRIPTION OF THE PREFERRED EMBODIMENTS

The preferred embodiments of the present invention will be described hereinafter with reference to the accompanying drawings.

Figure 1A:
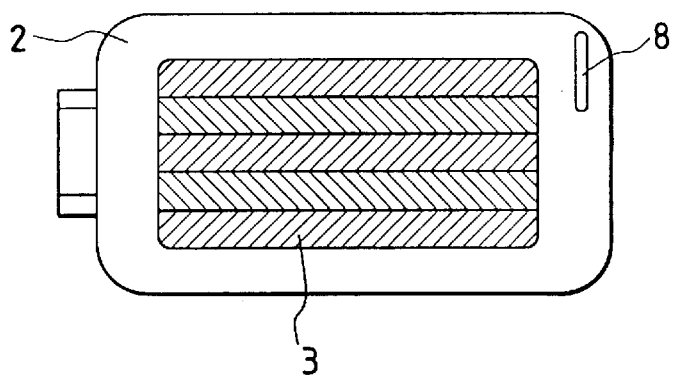
FIGS. 1A to 1D are views illustrating the respective states of a camera according to the first embodiment of the present invention.
Figure 1B:
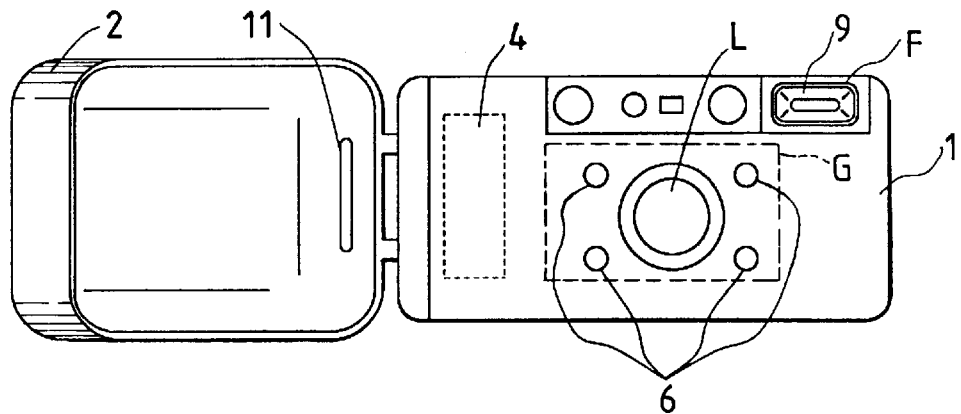
Figure 1C:
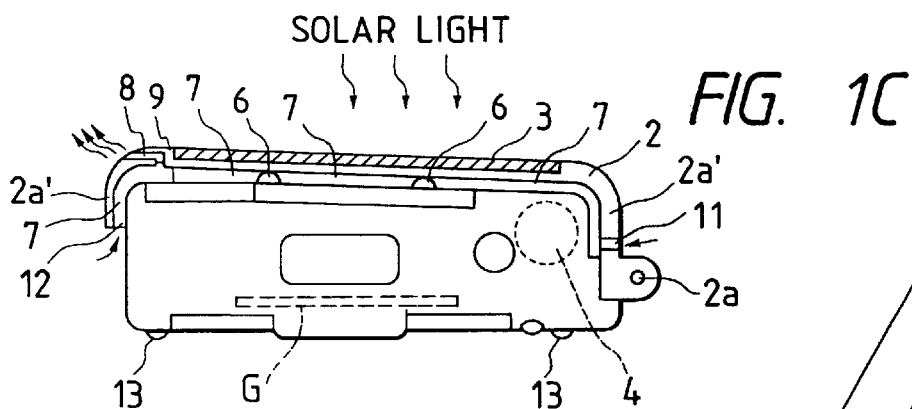
Figure 1D:
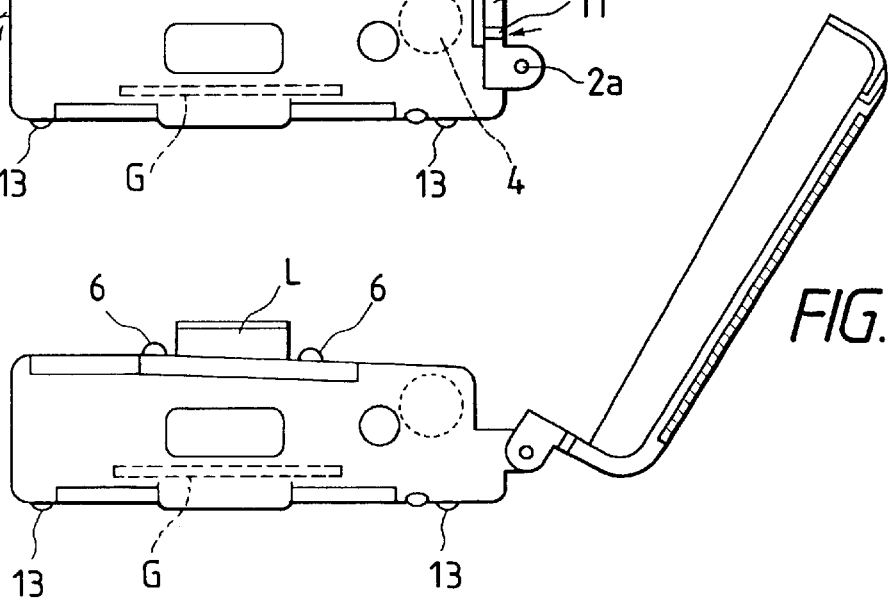

FIGS. 1A to 1D show the first embodiment of the present invention, i.e., a camera as an electronic equipment to which the present invention is applied. FIG. 1A is a front view of a state wherein a cover 2 is closed, FIG. 1B is a front view of a state wherein the cover 2 is opened, FIG. 1C is a partial sectional view of the state wherein the cover 2 is closed when viewed from the top, and FIG. 1D is a partial sectional view of the state wherein the cover 2 is opened when viewed from the top.

The cover 2, which also serves as a barrier for a lens barrel L, is supported to be free to open/close on a camera main body 1 as an electronic equipment main body, via a hinge shaft 2a. A solar energy collecting unit, such as, for example, a solar battery 3 is arranged on the outer surface of the cover 2. In the solar battery 3, cells are connected in series with each other, and are connected to a lithium ion secondary battery 4 via the hinge shaft (also serving as a conductive path) 2a as a lead portion and a reverse-flow prevention diode (to be described later). Projecting portions 6 are formed on the surface, on the cover 2 side, of the camera main body 1. When the inner surface of the cover 2 is brought into point-contact with the projecting portions 6, a three-dimensional air layer 7 is formed between the camera main body 1 and the cover 2. The air layer 7 is formed to obtain a heat insulation effect. Note that a side surface 2a' is formed on the cover 2 with respect to the arranging surface of the solar battery 3, and the air layer 7 also extends into the side surface portion of the cover 2, thus enhancing the heat insulation effect. An image recording medium (e.g., a film) G is loaded inside the camera main body.

Figure 3:
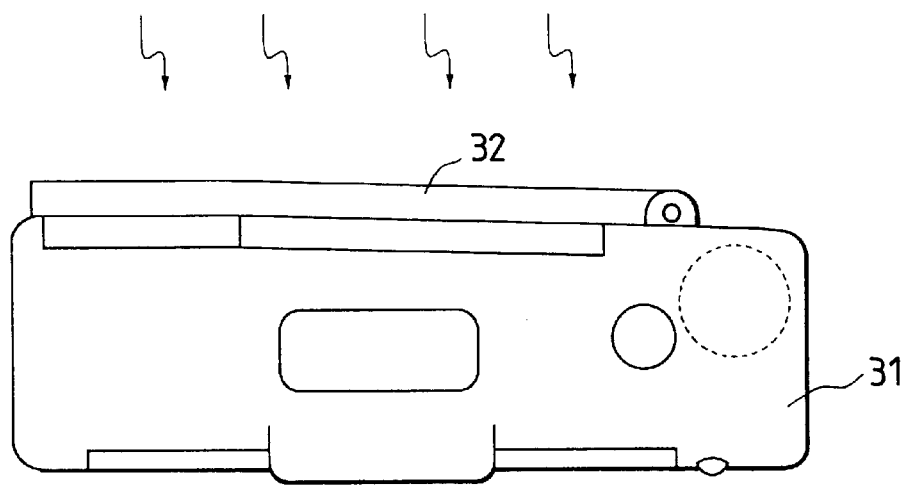
FIG. 3 is a view showing a conventional camera.

Assume a case wherein the camera is placed on a dashboard in a vehicle during the summer, and is exposed to direct solar light, as a severe condition of high temperature of the camera. In experiments, the temperature of the camera surface (cover surface) becomes 80° C. or higher, and the temperature inside the camera main body of a conventional structure (e.g., a structure shown in FIG. 3; a cover 32 is almost in surface-contact with a camera main body 31, and no air layer is formed therebetween) increases to 70° C. or higher. This is because since not only the temperature of the outer surface of the cover (32) but also the temperature of its inner surface become high due to the direct solar light, the temperature inside the camera main body becomes high due to the heat.

A lithium ion battery as a secondary battery for charging a solar battery has characteristics that an electrolyte deteriorates in an environment at a temperature exceeding 60° C., and the charging capacity undesirably decreases. Therefore, when a lithium ion secondary battery is incorporated in the camera main body, functions (including a charging function) of the camera are lost in the conventional structure.

Since the electronic equipment according to the present invention presupposes a condition that the solar battery is arranged on the outer surface of the cover, it must be born in mind that the equipment may be exposed to direct solar light in a high-temperature environment, and the functions, including the charging function, of the camera must be able to work in such a state, as a matter of course. The above-mentioned air layer 7 is formed for achieving the heat insulation effect, i.e., to prevent easy conduction of heat to the camera main body 1 even when the temperature of the cover 2 itself becomes high. The heat insulation effect of air is large; even when the temperature of the camera surface (the surface of the cover 2) becomes 80° C. or higher, the temperature inside the camera main body 1 having the air layer 7 as in the first embodiment can be sustained around ambient temperature (about a maximum of 60° C.), and deterioration of performance of the lithium ion secondary battery 4 in the main body can be prevented.

Note that the first embodiment provides other improvements to the camera in addition to the air layer 7. More specifically, ventilation holes 8 and 11 are formed on the cover 2. The ventilation hole 8 is formed on the same surface, as that where the solar battery 3 is arranged, of the cover 2, and the direction of the hole is locally offset from the direction of incidence of solar light, so that direct solar light to the solar battery 3 does not directly reach the camera main body 1. Also, the ventilation hole 11 is arranged on the side surface position, so that direct solar light does not reach the camera main body 1. Note that the cover 2 is formed into a box shape not only by the surface where the solar battery 3 is arranged but also by side surfaces 2a', thus improving the heat insulation effect. A gap is formed between the camera main body 1 and an end portion 12 of one side surface 2a' to provide the same effect as that of the ventilation hole.

In order that solar light radiates the solar battery 3, the camera must be placed with the cover 2 facing up, as shown in FIG. 1C. At this time, upon an increase in temperature of the cover 2, the natural convection of the internal air layer 7 occurs. That is, air coming into from the ventilation hole 11 and the end portion 12 flows through the air layer 7 and is output from the ventilation hole 8. Therefore, this natural convection contributes to prevention of an increase in internal temperature of the camera main body 1.

Since the inner side surface of the cover 2 is in point-contact with the camera main body 1 via the projecting portions 6, the increased temperature of the cover 2 itself can also be prevented from being conducted to the camera main body 1 via the contact portions.

Since a coupling portion, including the hinge shaft 2a, for coupling the camera main body 1 to the cover 2 projects away from the main body 1, the distance to the interior of the camera main body is prolonged to prevent easy conduction of the increased temperature of the cover 2 to the interior of the camera main body 1. When the hinge shaft 2a itself, the cover 2, and the outer surface of the camera main body 1 consist of a synthetic resin such as a plastic material having a small thermal conductivity, an increase in internal temperature of the camera main body can be reduced.

Note that a reflection umbrella 9 of a flash device F corresponds to the position of the ventilation hole 8 formed in the cover 2 (in a state wherein the cover 2 is closed). Therefore, heat entering from the ventilation hole 8 is thermally reflected by the reflection umbrella 9, and the reflection umbrella 9 contributes to prevent an increase in internal temperature of the camera main body 1.

A plurality of projecting portions 13 are formed on the back surface (the bottom surface in FIG. 1D) of the camera main body 1. These projecting portions 13 are formed in consideration of the fact that the camera main body 1 is placed with its back surface facing down when the secondary battery of the camera is charged. For example, if these projecting portions 13 are present, when the camera main body 1 is placed on the dashboard in a vehicle to charge the battery, the camera main body can be in point-contact with the placing surface so as to prevent easy conduction of heat of the dashboard to the camera main body 1.

The second embodiment will be described below with reference to FIGS. 2A to 2D.

The same reference numerals in this embodiment denote the same parts as in the first embodiment, and a detailed description thereof will be omitted. In the second embodiment, a flash device F' and the lithium ion secondary battery 4 constitute a unit 5, and the unit 5 is detachable from the camera main body 1 together with the cover 2. Therefore, the battery can be charged while the unit 5 is detached from the camera main body 1. Note that a coupling portion (including the hinge shaft 2a) to the cover 2 is provided to the unit 5.

A large reflection plate 10 having a curvature (having optical power) is attached to the inner surface of the cover 2. Flash light from the flash device F' is condensed not only by reflection of the reflection umbrella 9 but also by reflection of the reflection plate 10, so that a large amount of flash light can be radiated onto an object. That is, in order to obtain the same amount of flash light, the light emission amount of a light emission tube can be decreased. Projecting portions 6' are formed on the inner surface of the cover 2 to form the air layer 7 between the cover 2 and the camera main body 1.

Figure 4:
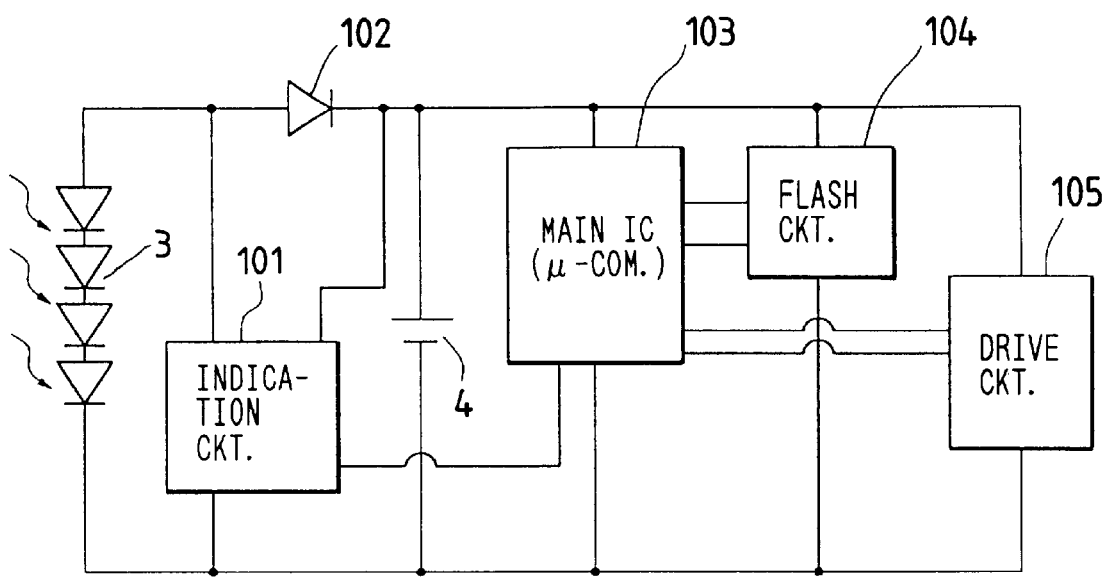
FIG. 4 is a circuit diagram showing a circuit of the first and second embodiments.

FIG. 4 is a circuit diagram showing the circuit to be used in the first and second embodiments described above.

The circuit shown in FIG. 4 includes amorphous solar cells 3 as the above-mentioned solar energy collecting unit (battery), the above-mentioned lithium ion secondary battery 4, and an indication circuit 101 showing the power generation state of the solar battery 3 and the voltage (charged) state of the lithium ion secondary battery. The indication circuit 101 preferably performs a numerical indication, or a mark accumulation indication using a bar, or the like. The circuit shown in FIG. 4 also includes a reverse-flow prevention diode 102, a main IC 103 incorporating a microcomputer for controlling a camera operation, a flash circuit 104 for controlling a flash operation of the above-mentioned flash device F (or F'), and a drive circuit 105 for other components (for example, film feed, barrel drive, and the like).

In the circuit operation, when light is radiated onto the solar battery 3, a current is supplied to the lithium ion secondary battery 4 via the reverse-flow prevention diode 102, thus charging the battery 4. The current amount from the solar battery 3 and the charged voltage of the lithium ion secondary battery 4 during the charging operation are indicated on the indication circuit 101 under the control of the main IC 103.

When no light is radiated onto the solar battery 3, and the solar battery 3 cannot generate any power, the reverse-flow prevention diode 102 acts to prevent the reverse flow of a current. Note that the circuit including the main IC 103 is operated by the lithium ion secondary battery 4.

Figure 5A:
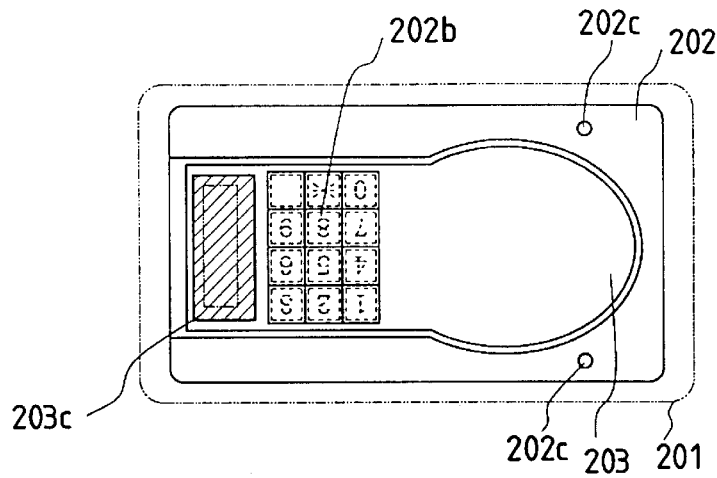
FIGS. 5A to 5D are views illustrating the respective states of a portable telephone set according to the third embodiment of the present invention.
Figure 5B:
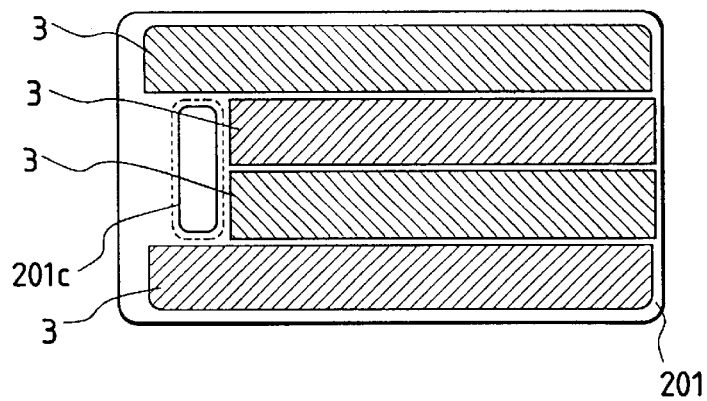
Figure 5C:
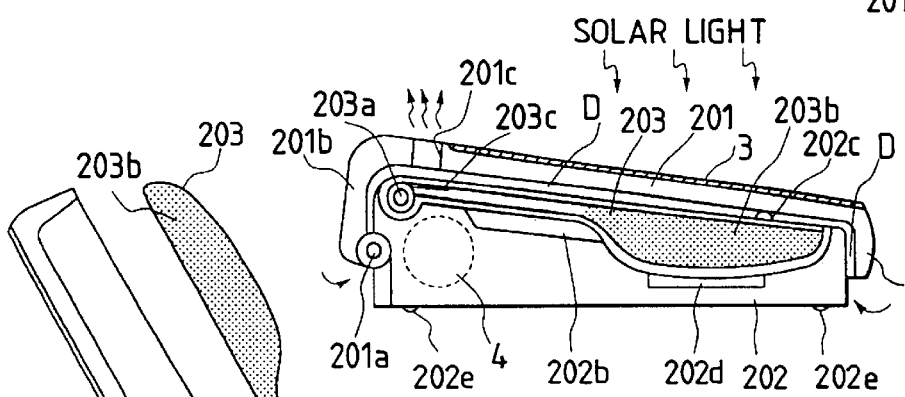
Figure 5D:
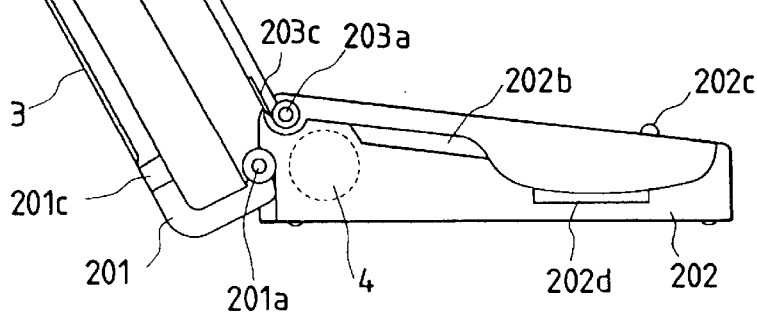

FIGS. 5A to 5D show the third embodiment. In this embodiment, the present invention is applied to a portable telephone set. FIG. 5A shows a state wherein a cover is detached, FIGS. 5B and 5C show a state wherein the cover is closed, and FIG. 5D shows a state wherein the cover is opened.

A box-shaped cover 201 having side surfaces as in the first and second embodiments is pivotally supported on a main body 202 of a portable telephone set via a hinge shaft 201a. The solar energy collecting unit (battery) 3 is arranged on the outer surface of the cover 201. In the solar battery 3, cells are connected in series with each other in the cover, and are connected to the lithium ion secondary battery 4 in the main body via the hinge shaft 201a as a lead portion and a reverse-flow prevention diode.

Projecting portions 202c are formed on the main body 202 to form an air layer D between the main body 202 and the cover 201. The air layer D also extends between side surfaces 201b of the cover 201 and the main body 202. A ventilation hole 201c is formed on the cover 201. As shown in FIG. 5C, when direct solar light is radiated onto the cover 201, and the temperature of the cover 201 begins to increase during charging of energy on the secondary battery 4, the temperature of the air layer D on the rear side of the cover also increases. At this time, the convection of air occurs, as indicated by arrows in FIG. 5C. In this case, air flows so that ambient air enters from gaps between the side surfaces 201b and the main body 202, and the internal air is exhausted from the ventilation hole 201c, thus maintaining the temperature of the air layer D on the rear surface of the cover 201 to be substantially equal to that of ambient air.

Thus, an increase in temperature of the main body 202 can be suppressed to be substantially equal to the ambient air temperature.

A microphone unit 202d is connected to a circuit unit (not shown). A push-button unit 202b has an arrangement, as indicated by a dotted line in FIG. 5A. A loudspeaker 203 is pivotally supported on the main body 202 via a hinge shaft 203a. The loudspeaker 203 has a loudspeaker unit 203b incorporating a tone generation member, at its distal end portion, and a plated portion (reflection portion) 203c is located at a position facing the ventilation hole 201c in a state wherein the cover 201 is closed, as shown in FIGS. 5B and 5C. The plated portion 203c regularly reflects direct solar light, which becomes incident to have an angle substantially parallel to the ventilation hole 201c, to a portion outside the cover, thereby preventing easy heat conduction to the loudspeaker unit 203b. Therefore, the reflection portion 203c is formed as a surface substantially perpendicular to the ventilation hole 201c. Since the plated portion 203c is formed on the electric portion of the loudspeaker 203, i.e., on a portion with the highest heat resistance, and is connected to the main body 202 having complicated functional components and the lithium ion secondary battery via only the hinge shaft 203a, even when the temperature of the plated portion 203c itself becomes relatively high, the influence of the high temperature on the main body 202 and the secondary battery 4 can be eliminated.

In the third embodiment as well, when the cover 201, the outer members of the main body 202, the hinge shafts 201a and 203a, the loudspeaker 203, and the like are molded using a plastic material having a low heat conductivity, an increase in internal temperature of the main body 202 can be reduced. Even when the placing surface (e.g., the surface of a dashboard in a vehicle) is at high temperature, a plurality of projecting portions 202e formed on the bottom surface of the main body 202 serve to prevent easy conduction of the heat on the placing surface to the main body 202.

Figure 6A:
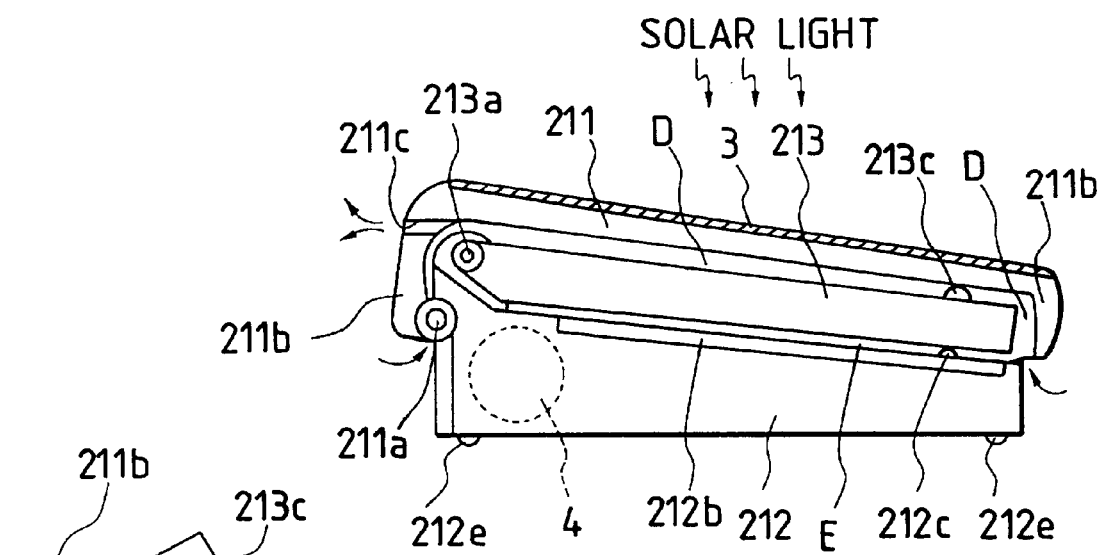
FIGS. 6A and 6B are views illustrating the respective states of a portable personal computer according to the fourth embodiment of the present invention.
Figure 6B:
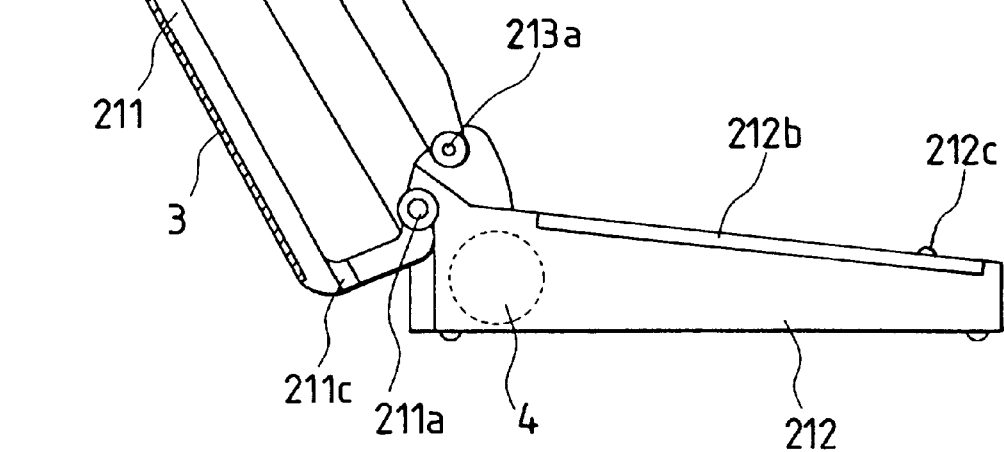

FIGS. 6A and 6B show the fourth embodiment. In this embodiment, the present invention is applied to a portable personal computer. FIG. 6A shows a state wherein a cover is closed, and FIG. 6B shows a state wherein the cover is opened.

A box-shaped cover 211 having side surface portions as in the first, second, and third embodiments is pivotally supported on a main body 212 of a portable personal computer as an electronic equipment via a hinge shaft 211a. The solar energy collecting unit (battery) 3 is arranged on the outer surface of the cover 211. In the solar battery 3, cells are connected in series with each other in the cover, and are connected to the lithium ion secondary battery 4 in the main body via the hinge shaft 211a and a reverse-flow prevention diode. A display 213 is pivotally supported on the main body 212 via a hinge shaft 213a, and has a screen (e.g., a screen of a liquid crystal display device) 213b. An air layer D is formed by projecting portions 213c between the display 213 and the cover 211. A ventilation hole 211c is formed at the side surface position of the cover 211, so that direct solar light does not directly enter the interior of the main body. Since side surfaces 211b define gaps between the display 213 and the main body 212, when the temperature of the cover 211 begins to increase during charging of energy on the secondary battery 4 upon radiation of direct solar light on the solar battery 3 on the cover 211, as shown in FIG. 6A, the temperature of the air layer D on the rear surface of the cover also increases. At this time, as in the above embodiments, the convection of air occurs, and an air flow is formed so that ambient air enters from the gap of the side surface 211b of the cover 211 and the internal air is exhausted from the ventilation hole 211c, thereby maintaining the temperature of the air layer D on the rear surface of the cover 211 to be substantially the ambient air temperature. Thus, an increase in temperature of the display 213 and the main body 212 can be suppressed to be substantially equal to the ambient air temperature.

In this embodiment, projecting portions 212c are formed on the main body 212 at positions offset from a keyboard unit 212b, thus forming an air layer E between the display 213 and the main body 212 in the state shown in FIG. 6A. Thus, heat of the cover 211 can be prevented from being easily conducted to the main body 212, and the adverse influence of an increase in temperature on the secondary battery arranged in the main body 212 can be eliminated.

Projecting portions 212e are formed on the bottom surface of the main body 212 to prevent easy conduction of heat on the placing surface to the main body 212.

In the fourth embodiment, the display 213 corresponds to the main body portion of an electronic equipment, and a combination of the main body 212 and the display 213 serve as an electronic equipment main body with respect to the cover 211.

In the third and fourth embodiments described above, a parabola antenna may be formed on the inner surface of the cover 201 or 211 to allow second-order use in an open state of the cover 201 or 211.

Each of the embodiments described above presupposes a condition that the solar battery is arranged on the outer surface of the cover, and an air layer is formed between the cover and the electronic equipment main body when the cover is closed, thereby providing an electronic equipment with a solar battery, which suppresses an increase in internal temperature of the electronic equipment main body by the heat insulation effect of the air layer, and can prevent the adverse influence of heat on the internal arrangement of the equipment, a charging unit, an image recording medium, and the like.

The cover is formed to have side surface portions, and an air layer is formed between the side surface portions and the electronic equipment main body, thus improving the effect of suppressing an increase in internal temperature of the main body.

Since a hole is formed in the cover or a gap is formed between the cover side surface portion and the electronic equipment main body so as to cause a natural convection of the air layer, an increase in internal temperature of the main body can be further suppressed.

Since a coupling portion for pivotally supporting the cover projects from the outer surface of the electronic equipment main body, the conduction distance of heat conducted via the coupling portion can be prolonged, thus suppressing an increase in internal temperature of the main body.

Upon application to a camera, since a reflection member for reflecting flash light of a flash device is arranged on the inner surface of the cover, even when the light emission amount is small, sufficient illumination can be realized using light reflected by the reflection member.

The above-mentioned embodiments and their technical elements may be combined as needed.

The individual components shown in schematic or block form in the Drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus adapted for use with a solar cell, said apparatus comprising:
   a body;
   a cover member to which said solar cell is attached, and which is movable between an open position and a closed position with respect to said body; and
   an air layer providing member which provides an air layer between the cover member and said body of said apparatus when said cover member is in the closed position, thereby reducing transmittance of heat from the solar cell to said body of said apparatus.

2. An apparatus according to claim 1, wherein the apparatus comprises an electronic device.

3. An apparatus according to claim 1, wherein said apparatus is portable.

4. An apparatus according to claim 1, wherein the apparatus comprises a camera.

5. An apparatus according to claim 1, further comprising:
   a coupling portion that couples said cover member to said body of said apparatus, said coupling portion being arranged on an exterior portion of said body of said apparatus and projecting therefrom.

6. An apparatus according to claim 1, further comprising:
   a coupling portion that couples said cover member to said body of said apparatus, said coupling portion comprising a synthetic resin.

7. An apparatus according to claim 1, further comprising:
   a flash reflection portion disposed on said cover member.

8. An apparatus according to claim 1, wherein said cover member has an open box shape for covering an exterior portion of said body of said apparatus.

9. An apparatus according to claim 8, wherein said cover member has, on different surfaces thereof, hole forming portions for forming holes for convecting an air layer space formed by said air layer providing member with external ambient air.

10. An apparatus according to claim 1, wherein the solar cell is arranged on an outer surface of said cover member.

11. An apparatus according to claim 10, wherein said air layer providing member forms an air layer space between an inner surface of said cover member and an exterior side of said body of said apparatus.

12. An apparatus according to claim 1, further comprising:
    a hole forming portion that forms a hole for convecting an air layer space formed by said air layer providing member with external ambient air.

13. An apparatus according to claim 12, wherein said hole forming portion comprises means for preventing external light from directly radiating the apparatus via the hole.

14. An apparatus according to claim 12, further comprising:
    a reflection portion arranged at a position facing the hole.

15. An apparatus according to claim 14, wherein the reflection portion comprises a reflection portion for a flash device.

16. An apparatus according to claim 1, further comprising:
    means for convecting air inside the air layer with external ambient air.

17. An apparatus adapted for use with a solar cell and to which a battery containing unit having an exterior side is attachable, said apparatus comprising:
    a cover member to which said solar cell is attached and which is movable between an open position and a closed position with respect to a body of said apparatus; and
    an air layer providing member which provides an air layer between said cover member and the exterior side of the battery containing unit when said cover member is in the closed position, thereby reducing transmittance of heat from the solar cell to the battery contained in the battery containing unit.

18. An apparatus according to claim 17, wherein the battery contained in the battery containing unit is a rechargeable battery.

19. An apparatus according to claim 17, wherein the apparatus comprises an electronic device.

20. An apparatus according to claim 17, wherein said apparatus is portable.

21. An apparatus according to claim 17, wherein said apparatus comprises a camera.

22. An apparatus according to claim 17, wherein the battery containing unit comprises a secondary battery.

23. An apparatus according to claim 17, wherein the battery containing unit comprises a lithium ion battery.

24. An apparatus according to claim 17, further comprising:
    a coupling portion that couples said cover member to said body of said apparatus, said coupling portion projecting from an outer portion of said body of said apparatus.

25. An apparatus according to claim 17, further comprising:
    a coupling portion that couples said cover member to said body of said apparatus, said coupling portion comprising a synthetic resin.

26. An apparatus according to claim 17, further comprising:
    a flash reflection portion arranged on said cover member.

27. An apparatus according to claim 17, wherein said cover member has an open box shape for covering an exterior portion of said body of said apparatus.

28. An apparatus according to claim 27, wherein said cover member has, on different surfaces thereof, hole forming portions that form holes for convecting a space formed by said air layer providing member with external ambient air.

29. An apparatus according to claim 17, wherein the solar cell is arranged on an outer surface of said cover member.

30. An apparatus according to claim 17, further comprising:
a body having an exterior side, and
wherein said air layer providing member forms an air layer space between an inner surface of said cover member and the exterior side of said body of said apparatus.

31. An apparatus according to claim 17, further comprising:
a hole forming portion that forms a hole for convecting the air layer with external ambient air.

32. An apparatus according to claim 31, wherein said hole forming portion comprises means for preventing external light from directly radiating the apparatus via the hole.

33. An apparatus according to claim 31, further comprising:
a reflection portion arranged at a position facing the hole.

34. An apparatus according to claim 33, wherein the reflection portion comprises a reflection portion for a flash device.

35. An apparatus according to claim 17, further comprising:
means for convecting the air layer with external ambient air.

36. A battery containing unit comprising:
a solar cell;
a battery chargeable by said solar cell; and
an air layer providing member which forms an air layer between said solar cell and said battery, thereby reducing transmittance of heat from the solar cell to said battery.

37. A battery containing unit according to claim 36, wherein the battery is a lithium ion battery.

38. A battery containing unit according to claim 36, further comprising:
a closable cover on which the solar cell is arranged.

39. A battery containing unit according to claim 36, further comprising:
a closable cover on an outer surface of which the solar cell is arranged,
wherein said air layer providing member forms the air layer between an inside of said closable cover and an exterior side of a body of the battery containing unit.

40. An apparatus adapted for use with a solar cell, said apparatus comprising:
a body;
a cover member to which the solar cell is attached, and which is free to open and close with respect to said body of said apparatus; and
a projection portion formed on said body of said apparatus,
wherein when said cover member is in a closed position, the solar cell is exposed for collecting incident light, and said projection portion minimizes a contact region between said cover member and said body of said apparatus, and
wherein said apparatus is inoperable when said cover member is in the closed position.

41. An apparatus according to claim 40, wherein said apparatus includes an electronic device.

42. An apparatus according to claim 40, wherein said apparatus comprises a camera.

43. An apparatus according to claim 40, wherein the solar cell is arranged on an outer surface of said cover member.

44. An apparatus adapted for use with a solar cell, said apparatus comprising:
a body;
a cover member to which the solar cell is attached, and which is free to open and close with respect to said body of said apparatus; and
a projection portion formed on said body of said apparatus,
wherein when said cover member is in a closed position, the solar cell is exposed for collecting incident light, and said projection portion minimizes a contact region between said cover member and said body of said apparatus, and
wherein said cover member includes a through hole that convects external air through a gap formed between said cover member and an exterior side of said body of the apparatus.

45. An apparatus according to claim 44, wherein said cover member comprises means for preventing external light from directly radiating said apparatus via the through hole.

46. An apparatus according to claim 44, further comprising a reflection portion arranged at a position facing the through hole.

47. An apparatus according to claim 46, further comprising a flash device, wherein said flash device comprises said reflection portion.

48. An apparatus adapted for use with a solar cell, said apparatus comprising:
a body;
a cover member to which the solar cell is attached, and which is free to open and close with respect to said body of said apparatus; and
a projection portion formed on said cover member,
wherein when said cover member is in a closed position, the solar cell is exposed for collecting incident light, and said projection portion minimizes a contact region between said cover member and said body of said apparatus, and
wherein said apparatus is inoperable when said cover member is in the closed position.

49. An apparatus according to claim 48, wherein said apparatus includes an electronic device.

50. An apparatus according to claim 48, wherein said apparatus comprises a camera.

51. An apparatus according to claim 48, wherein the solar cell is arranged on an outer surface of said cover member.

52. An apparatus adapted for use with a solar cell, said apparatus comprising:
a body;
a cover member to which the solar cell is attached, and which is free to open and close with respect to said body of said apparatus; and
a projection portion formed on said cover member,
wherein when said cover member is in a closed position, the solar cell is exposed for collecting incident light, and said projection portion minimizes a contact region between said cover member and said body of said apparatus, and
wherein said cover member includes a through hole that convects external air through a gap formed between said cover member and an exterior side of said body of said apparatus.

53. An apparatus according to claim 52, wherein said cover member comprises means for preventing external light from directly radiating said apparatus via the through hole.

54. An apparatus according to claim 52, further comprising a reflection portion arranged at a position facing the through hole.

55. An apparatus according to claim 54, further comprising a flash device, wherein said flash device comprises said reflection portion.

56. An apparatus comprising:

a body having a projection formed thereon;

a solar cell; and a cover member supporting said solar cell and movable between an open position and a closed position relative to said body, wherein when said cover member is in the open position, said projection is separated from said cover member, and when said cover member is in the closed position, said projection abuts said cover member and minimizes a contact region between said cover member and said body of said apparatus.

57. An apparatus according to claim 56, wherein said body is a camera body.

58. An apparatus comprising:

a body having a projection formed thereon;

a solar cell; and a cover member supporting said solar cell and movable between an open position and a closed position relative to said body, wherein when said cover member is in the open position, said projection is separated from said cover member, and when said cover member is in the closed position, said projection abuts said cover member so as to form an air gap layer between said cover member and said apparatus.

59. An apparatus according to claim 58, wherein said body is a camera body.

* * * * *